United States Patent
Sakoda et al.

(10) Patent No.: US 6,195,341 B1
(45) Date of Patent: Feb. 27, 2001

(54) COMMUNICATION METHOD, BASE STATION AND TERMINAL APPARATUS

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/965,965

(22) Filed: Nov. 7, 1997

(30) Foreign Application Priority Data

Nov. 8, 1996 (JP) ................................................. 08-296937

(51) Int. Cl.[7] ................................ H04J 4/00; H04Q 7/00
(52) U.S. Cl. ............................................. 370/330; 370/436
(58) Field of Search .................................... 370/319, 329, 370/330, 343, 344, 350, 436, 480, 496, 345, 498

(56) References Cited

U.S. PATENT DOCUMENTS

| 5,241,688 | * | 8/1993 | Arora | ..................................... 455/502 |
| 5,517,675 | * | 5/1996 | O'Connor et al. | ..................... 455/437 |
| 5,541,552 | | 7/1996 | Suzuki et al. . | |
| 5,694,415 | | 12/1997 | Suzuki et al. . | |
| 5,805,633 | * | 9/1998 | Uddenfeldt | ............................ 375/202 |
| 5,933,420 | * | 8/1999 | Jaszewski et al. | .................... 370/329 |
| 5,936,950 | * | 8/1999 | Hottinen | ................................ 370/342 |

* cited by examiner

Primary Examiner—Chi H. Pham
Assistant Examiner—Kwang B. Yao
(74) Attorney, Agent, or Firm—Jay H. Maioli

(57) ABSTRACT

A communication method for carrying out communication in a multi-carrier format using a plurality of sub-carriers and including a first communication step of setting an interval among the plurality of sub-carriers to a first frequency interval when information of a first kind is communicated, and a second communication step of setting an interval among the plurality of sub-carriers to a second frequency interval, that is wider than the first frequency interval, when information of a second kind is communicated.

31 Claims, 16 Drawing Sheets

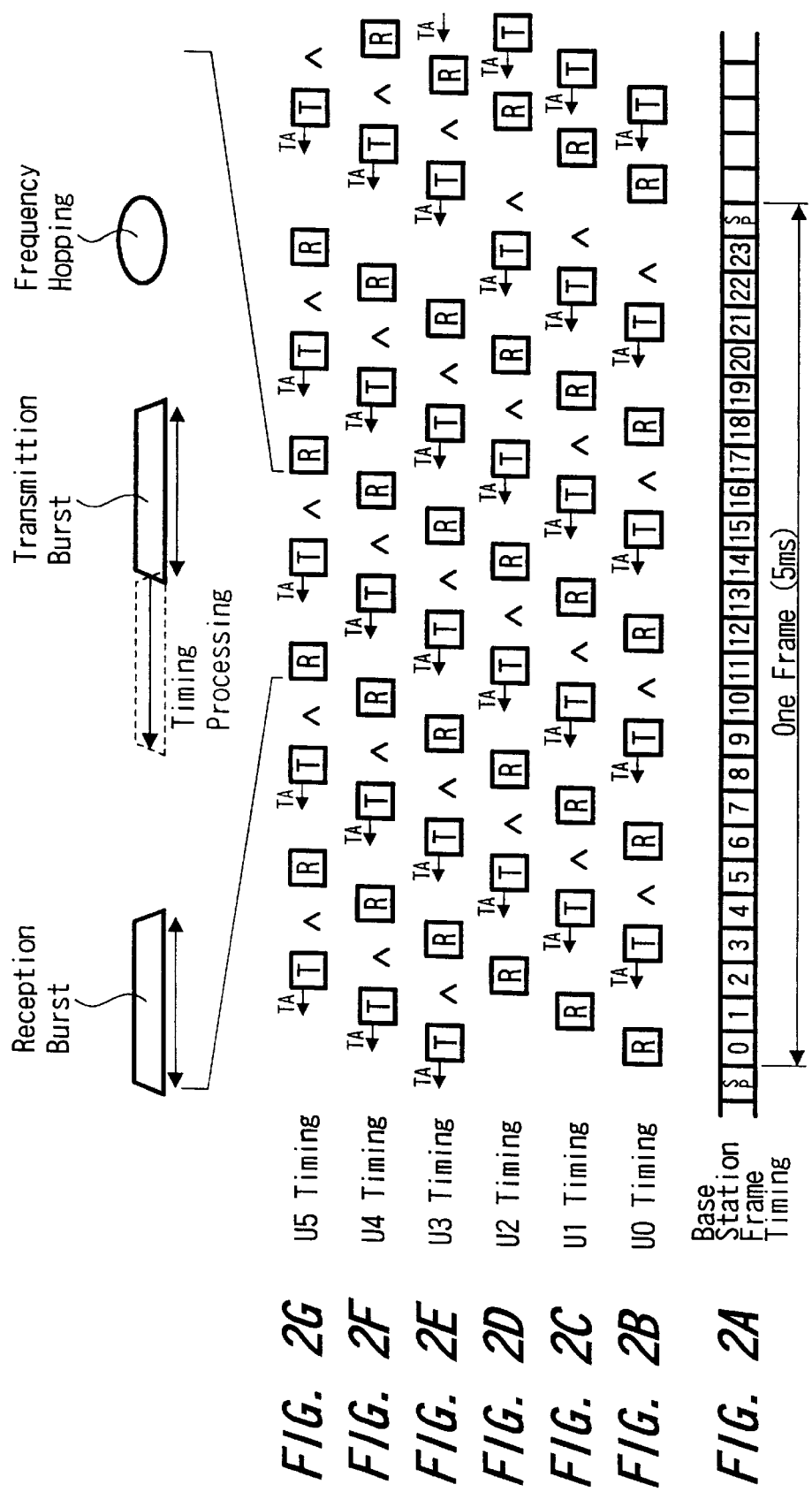

COMMUNICATION METHOD, BASE STATION AND TERMINAL APPARATUS

BACKGROUND OF THE INVENTION

1. Field of the Invention

The present invention relates to a communication method suitable for application to, for example, a base station and a terminal apparatus in a radio telephone system, and a base station and a terminal apparatus to both of which the communication method is applied.

2. Description of the Related Art

In a mobile communication system such as a radio telephone system or the like, a multiple access is carried out wherein a plurality of mobile stations (subscribers or terminal apparatus) have access to a single base station. In the case of the radio telephone, since a plurality of mobile stations share a single base station, a variety of communication systems have been proposed in order to avoid interference among the respective mobile stations. For example, conventional methods of communication of this type include a frequency division multiple access (FDMA), a time division multiple access (TDMA), a code division multiple access (CDMA) and so on.

According to the TDMA system, each transmission channel allocated to each base station is divided by a predetermined period of time to form a plurality of time slots in one transmission channel, and each of the time slots is allocated to a mobile station to be connected, thereby allowing simultaneous connection to a plurality of mobile stations using one transmission channel.

Further, as another system of communication, the present applicant has proposed a system of communication referred to as a band division multiple access (BDMA) (Japanese unexamined patent publication No. 8-132434 and others). Although the BDMA system will be explained in detail in preferred embodiments of the invention to be described later, briefly, it is a system wherein a plurality of one-transmission bands having a predetermined number of sub-carrier signals arranged at predetermined frequency interval are prepared; the signal in each of the transmission bands is segmented at a predetermined period of time to form time slots; and a burst signal is transmitted in the form of a multi-carrier signal which is data distributed to said predetermined number of subcarrier signals intermittently at the cycle of a predetermined number of time slots. The BDMA system exhibits excellent transmission characteristics.

When the TDMA system is applied to a radio telephone system, a terminal apparatus must communicate to a base station in synchronization with a reference timing set by the base station to prevent interference between time slots of each channel. Since the distance between the terminal apparatus and the base station is not constant, even if a signal is transmitted from each terminal apparatus to the base station at the same timing, different propagation delays are caused in the signal transmitted from each terminal apparatus and hence the timing at which the base station can receive these signals varies for each channel.

Thus, there is a need for a process to correct the timing. For example, a process has been performed wherein the base station detects the amount of delay of a signal transmitted from each terminal apparatus from the reference timing and control data is transmitted to the terminal apparatus to shift the transmission timing in accordance with the amount of delay, thereby performing correction such that reception can occur at a constant timing (a time alignment process).

However, such a time alignment process involves bidirectional data transmission and, therefore, it can be carried out only on communication in progress between a base station and a terminal apparatus. For example, it has been impossible to perform a time alignment process on an access request signal transmitted from a terminal apparatus to a base station to request the commencement of communication (access request).

Therefore, in order to prevent transmission of a signal which has not been subjected to a time alignment processing from causing any problem, it can be considered that the number of bits to be transmitted is decreased and a period of a signal burst having the bits allocated on the time axis is set shorter. This has never been applied to a multi-carrier communication to which the present invention is directed. In general, when a method of improving reliability of a signal on a channel for achieving an access right is carried out, only an increase of transmission power per symbol has been attempted. However, this increase of the transmission power per symbol results in interference to other cells in view of the whole cellular system, and hence it is not preferable.

SUMMARY OF THE INVENTION

In view of such aspects, it is an object of the present invention to allow a satisfactory transmission of an access request to a base station and so on when communication in a radio telephone system or the like can be carried out in an efficient system.

According to a first aspect of the present invention, a communication method of carrying out communication in a multi-carrier format using a plurality of sub-carriers includes a first communication step of setting an interval among the plurality of sub-carriers to a first frequency interval when information of a first kind is communicated, and a second communication step of setting an interval among the plurality of sub-carriers to a second frequency interval, that is wider than the first frequency interval, when information of a second kind is communicated.

According to a second aspect of the present invention, a base station in a cellular system in a multi-carrier format using a plurality of sub-carriers for communication to a subscriber includes receiving means for receiving a signal from the subscriber, reception processing means for carrying out a processing in a state that an interval among the plurality of sub-carriers is set to a first frequency interval when general information is communicated and for carrying out a processing in a state that an interval among the plurality of sub-carriers is set to a second frequency interval, which is wider than the first frequency interval, when communication control information is communicated, signal generating means for generating a signal to be transmitted to the subscriber, and, transmitting means for transmitting the signal generated by the signal generating means to the subscriber.

According to a third aspect of the present invention, a subscriber in a cellular system in a multi-carrier format using a plurality of sub-carriers upon communication to a base station includes reception means for receiving a signal from the base station, reception processing means for processing a signal received by the reception means, signal generating means for generating a signal formed in a state that an interval among the plurality of sub-carriers is set to a first frequency interval when general information is communicated and for generating a signal formed in a state that an interval among the plurality of sub-carriers is set to a second frequency interval, which is wider than the first frequency interval, when communication control information is communicated, and transmitting means for transmitting the signal generated by the signal generating means to the base station.

BRIEF DESCRIPTION OF THE DRAWINGS

FIGS. 2A to 2G are diagrams used to explain a state of transmission in one frame according to an embodiment;

DESCRIPTION OF THE PREFERRED EMBODIMENTS

An embodiment of the present invention will now be described with reference to the accompanying drawings.

First, a configuration of a basic communication system to which the present embodiment is applied will now be described with reference to FIGS. 1 through 3. The configuration of the communication system according to the present embodiment is a so-called multi-carrier system wherein a plurality of subcarriers are successively disposed in a band and allocated in advance wherein the plurality of subcarriers in one band are simultaneously used in one transmission path. Further, all of the plurality of subcarriers in the one band are subjected to band division to be modulated, which is referred to as a band division multiple access (BDMA).

Figure 1:
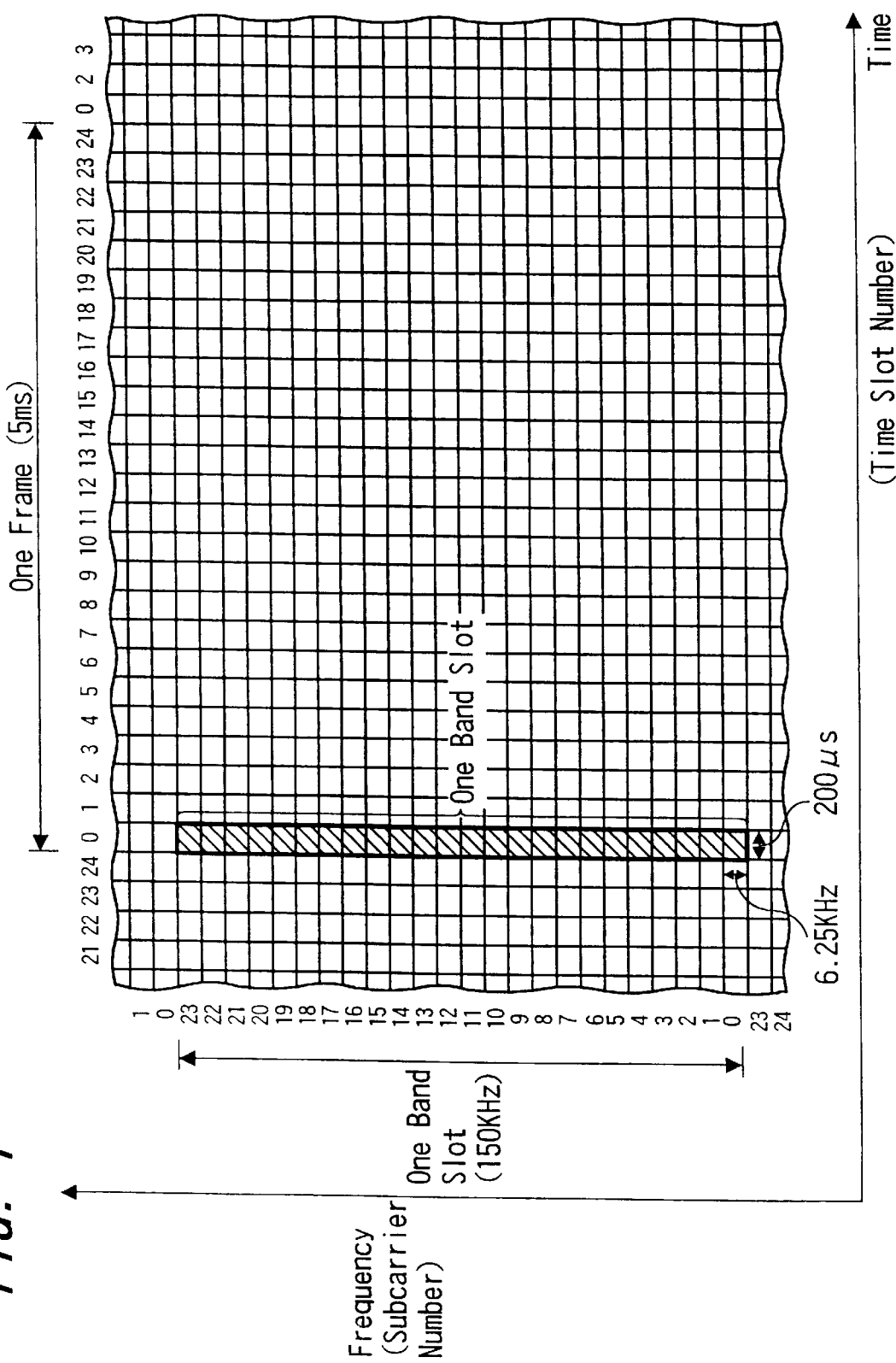
FIG. 1 is an explanatory diagram showing a configuration of slots in a transmission signal according to an embodiment of the present invention.

Referring now to the configuration, FIG. 1 is a view showing a slot configuration of a signal transmitted according to the present embodiment wherein the ordinate and the abscissa indicate a frequency and a time, respectively. In the present embodiment, there is provided an orthogonal basis wherein the frequency base and time base are divided in the form of a grid. Specifically, one transmission band (one-band slot) is set to 150 kHz, and 24 subcarriers are arranged in such transmission band of 150 kHz. The 24 subcarriers are successively arranged at an equal interval of 6.25 kHz, and subcarrier numbers 0 through 23 are assigned to each carrier. However, there are actually provided 22 subcarriers, i.e., subcarriers No. 1 through No. 22, and subcarrier Nos. 0 and 23 on both sides of one band slot are made as guard bands in which no subcarrier is provided and for which the electric power is set to zero.

Referring to the time base, one time slot is defined at every 200 μsec. interval, and a burst signal is modulated into 22 subcarriers to be transmitted for each time slot. A state wherein 25 time slots (i.e., 5 msec.) are arranged is defined as one frame. Time slot numbers 0 through 24 are assigned to the time slots in one frame. The range indicated by hatching in FIG. 1 represents the section of one time slot in one band slot. Here, the time slot assigned a time slot number 24 is a period in which no data is transmitted.

Using this orthogonal basis wherein the frequency base and time base are divided in the form of a grid, multiple access is achieved wherein a base station communicates with a plurality of mobile stations (terminal apparatus) in the same period of time. The connection with each mobile station is made using the configuration shown in FIGS. 2A to 2G. FIGS. 2A to 2G are diagrams showing how six mobile stations (users) U0, U1, U2, . . . , U5 connected to a base station use time slots by one band slot (in practice, a band slot used is switched by frequency hopping described later), wherein a time slot indicated by R is a reception time slot; a time slot indicated by T is a transmission time slot; and a frame timing defined by the base station is set at a cycle of 24 time slots (the slot No. 24 which is the last slot of the 25 time slots prepared is not used) as shown in FIG. 2A. It is assumed here that the transmission slot and the reception slot are transmitted using separate bands.

For example, a mobile station U0 shown in FIG. 2B uses time slots No. 0, 6, 12 and 18 in one frame as reception slots, uses time slots No. 3, 9, 15 and 21 as transmission slots and receives or transmits a burst signal in each time slot. A mobile station U1 shown at in FIG. 2C uses time slots No. 1, 7, 13 and 19 in one frame as reception slots and uses time slots No. 4, 10, 16 and 22 as transmission slots. A mobile station U2 shown in FIG. 2D uses time slots No. 2, 8, 14 and 20 in one frame as reception slots and uses time slots No. 5, 11, 17 and 23 as transmission slots. A mobile station U3 shown in FIG. 2E uses time slots No. 3, 9, 15 and 21 in one frame as reception slots and uses time slots No. 0, 6, 12 and 18 as transmission slots. A mobile station U4 shown in FIG. 2F uses time slots No. 4, 10, 16 and 22 in one frame as reception slots and uses time slots No. 1, 7, 13 and 22 as transmission slots. Further, a mobile station U5 shown in FIG. 2G uses time slots No. 5, 11, 16 and 22 in one frame as reception slots and uses time slots No. 2, 8, 14 and 20 as transmission slots.

While the configuration shown in FIGS. 2A to 2G allows a TDMA (time division multiple access) wherein six mobile stations are connected to one band slot, when this is viewed from the end of each mobile station, it has an allowance of two time slot periods (i.e., 400 μsec.) between reception and transmission in one time slot period and the next transmission and reception and utilizes this allowance to perform a timing process and a process referred to as a frequency hopping. Specifically, in the period of about 200 μsec. preceding each transmission slot T, a timing process TA is performed to adjust the transmission timing to the timing of a signal from the base station. 200 μsec. after the end of each transmission slot T, frequency hopping is performed to switch the band slot for transmission and reception to another band slot. The timing described here is an example of a case wherein a high transmission rate is set and, if the number of band slots used is changed with the transmission rate set lower, the timing of frequency hopping and the like must be set separately. Frequency hopping allows, for example, a plurality of band slots prepared at one base station to be used by each mobile station evenly.

Specifically, a plurality of band slots are allocated to one base station. For example, in the case of a cellular type system wherein one base station constitutes one cell and a band of 1.2 MHz is allocated to one cell, eight band slots can be provided at one cell. Similarly, when a band of 2.4 MHz is allocated to one cell, 16 band slots can be provided at one cell; when a band of 4.8 MHz is allocated to one cell, 32 band slots can be provided at one cell; and when a band of 9.6 MHz is allocated to one cell, 64 band slots can be provided at one cell. A frequency switching process referred to as the frequency hopping is performed such that a plurality of band slots allocated to one cell are evenly used. In the present embodiment, a plurality of band slots having continuous bands are provided at one cell.

Figures 3A, 3B:
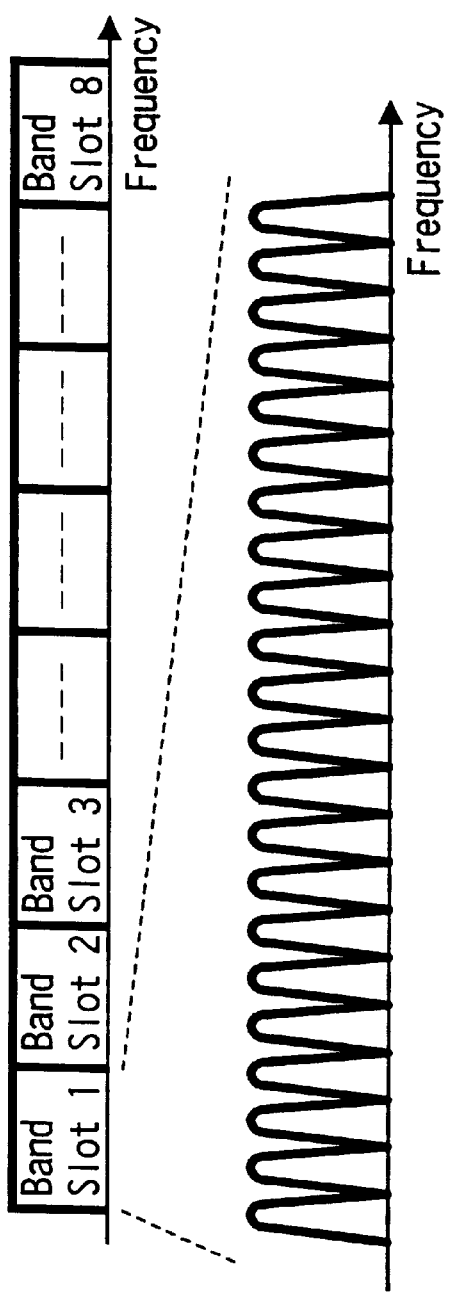
FIGS. 3A and 3B are diagrams used to explain an example of arrangement of band slots according to an embodiment.

FIGS. 3A to 3B show an example wherein eight band slots are provided at one cell and, as shown in FIG. 3A, 22 carriers are set in each of the eight band slots thus prepared to perform data transmission as shown in FIG. 3B.

By setting conditions for communication as described above, a signal transmitted between each mobile station and the base station is kept orthogonal to other signals, which prevents interference by other signals to allow a relevant signal to be preferably extracted. Further, since the band slot used for transmission is switched by frequency hopping at an appropriate time, the transmission band prepared for each base station is effectively utilized to allow efficient transmission. In this case, since an arbitrary frequency band can be allocated to one base station (cell) as described above, a system can be flexibly set depending on the situation wherein it is used.

There will be described arrangements of a base station and a terminal apparatus (a mobile station) employed when communication is carried out between the base station and the terminal apparatus by using the above-mentioned system arrangement. An arrangement of the terminal apparatus for transmitting a signal to the base station will be described with reference to FIG. 4.

Transmission data (digital data) transmitted from the terminal apparatus to the base station is supplied from a transmission data generating circuit 101 to a symbol pattern storing circuit 102. This symbol pattern storing circuit 102 is formed of a memory for storing a symbol pattern to be transmitted and outputs a symbol pattern corresponding to the transmission data output from the transmission data generating circuit 101 in a time series fashion.

The symbol pattern storing circuit 102 supplies the symbol pattern output therefrom in a time series fashion to an inverse fast Fourier transform circuit (hereinafter referred to as IFFT circuit) 103, and then the IFFT circuit 103 converts data on a frequency base into data on a time base through a inverse fast Fourier transform processing. In this transform processing, each of the symbol patterns is converted into a time series signal formed of data dispersively allocated to twenty-two sub-carriers set at an interval of a constant frequency $f_k$. As described later on, when the control data is transmitted to the base station by using the control channel, each of the symbol patterns is converted into a time series signal formed of data dispersively allocated to twenty-two sub-carriers set at an interval of a frequency $2f_k$ twice the frequency $f_k$.

An output signal from the IFFT circuit 103 is supplied to a windowing circuit 104 and then multiplied with transmission windowing data. The windowing circuit 104 supplies the transmission signal multiplied with the windowing data to a digital/analog converter 105. Then, the D/A converter 105 converts it into an analog transmission signal and supplies the analog transmission signal to a mixer 106 for converting a frequency. The mixer 106 mixes the analog transmission signal with an output from an oscillator 107 to convert the frequency of the transmission signal into a transmission frequency. This signal having the transmission frequency is amplified by a transmission amplifier 108 so as to have a predetermined power and then transmitted from an antenna 109. A specific arrangement of the circuits from the transmission data generating circuit 101 to the antenna 109 in the terminal apparatus will be described later on.

Figure 5A:
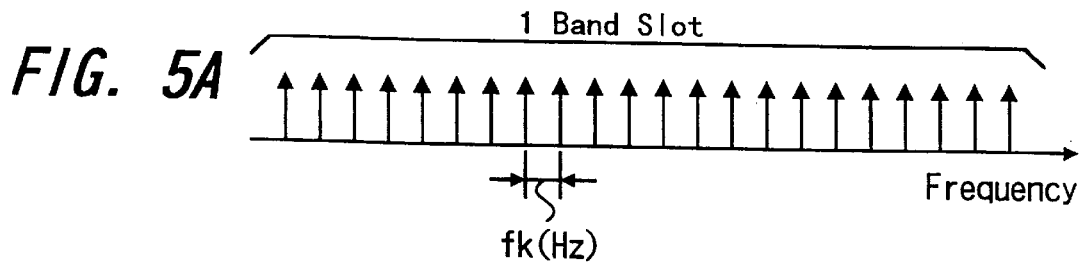
FIGS. 5A and 5B are diagrams used to explain an information channel arrangement generated in a transmission processing according to the embodiment.

The transmission signal processed in the arrangement according to this embodiment will be described. Described with reference to FIG. 1, twenty-two sub-carriers forming one band slot are provided. As shown in FIG. 5A, a signal dispersed to the twenty-two sub-carriers set at an interval of the frequency $f_k$ (an interval of 6.25 kHz in the example shown in FIG. 1) is located in one band slot and then transmitted. In view of the time base, a signal modulated to the respective carriers in one band slot can be expressed as a signal of $1/f_k$ [sec.] (this time of $1/f_k$ [sec.] is referred to as $T_k$ [sec.]) as shown in FIG. 5B.

Figure 5B:
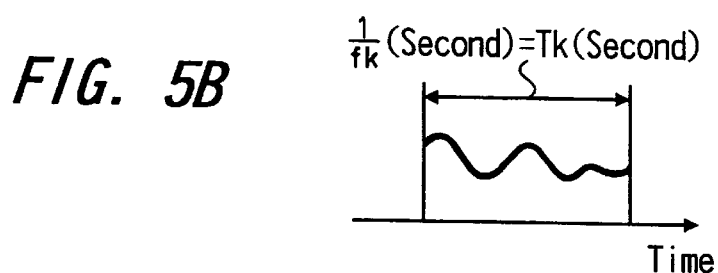
Figure 6A:
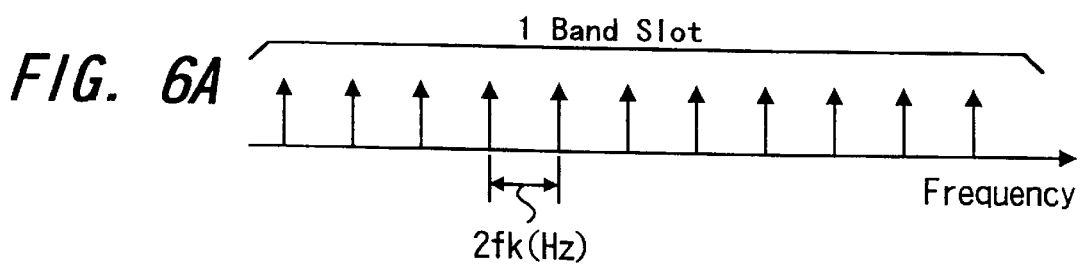
FIGS. 6A and 6B are diagrams used to explain an up-control channel generated in the transmission processing according to the embodiment.
Figure 6B:
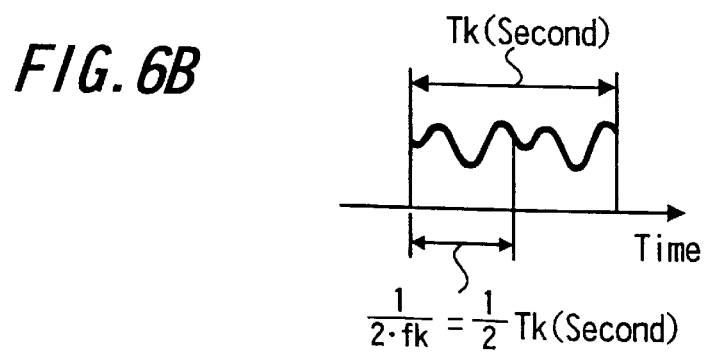

A signal transmitted in accordance with a format shown in FIGS. 5A and 5B is a signal indicative of a telephone audio data and various informations in an information channel. In an up-link control channel used to transmit the control data from the terminal apparatus to the base station, a signal is transmitted in accordance with a format shown in FIGS. 6A, 6B. Specifically, as shown in FIG. 6A, a signal dispersed to eleven sub-carriers set at an interval of a frequency $2f_k$ (an interval of 12.5 kHz in the example shown in FIG. 1) twice of the frequency interval employed for the information channel is provided in one band slot and transmitted. In view of the time base, as shown in FIG. 6B, the signal modulated to respective carriers in one band slot can be expressed as the signal of $T_k$ [sec.]. The signal of $T_k$ [sec.] is a signal in which data of ½ $f_k$ (i.e., $T_k/2$ [sec.]) is repeated twice.

Data having the arrangement shown in FIGS. 6A and 6B and transmitted on the up-link control channel is the control data transmitted from the terminal apparatus to the base station, and the control data includes data used for requesting an access of the terminal apparatus to the base station. For example, when the terminal apparatus is to transmit a signal to the base station, the terminal apparatus transmits data of an access request to the base station by using the up-link control channel. When data indicative of an allowance of access is transmitted from the base station to the terminal apparatus by using the down-link control channel, the terminal apparatus uses an information channel of channel indication data transmitted at the same time to start communication between the terminal apparatus and the base station on the indicated information channel. When the terminal apparatus transmits data to the base station by using the up-link control channel, the data to a predetermined position of which a known predetermined symbol pattern is attached is transmitted.

The up-link control channel having the arrangement shown in FIGS. 6A and 6B is also used upon registration and a response to the terminal apparatus calling for the base station, other than upon the call out from the terminal apparatus to the base station.

As shown in FIGS. 6A and 6B, in the up-link control channel, the number of the sub-carriers forming one band slot is set to half of the number of other channels such as the information channel or the like and hence the frequency interval among the sub-carriers is set twice as wide, when the base station demodulates the information transmitted on the up-link control channel, it becomes possible to satisfactorily receive the information. In particular, in this embodiment, in view of the time base, the multi-carrier signal has the same data twice repeated during a period of $T_k$ as shown in FIG. 6B, and the opportunity for receiving the same information becomes twice as likely, which can improve the reception characteristic by about 3 dB.

When receiving the up-link control channel signal transmitted from the terminal apparatus, the base station demodulates the data included in the reception signal and carries out the processing based on the data. At this time, the base station detects a reception timing of the known symbol pattern included in the reception signal and determines the difference between the detected reception timing and a reference timing of communication at the base station, thereby carrying out the time alignment processing for transmitting data for correcting the determined difference to the corresponding terminal apparatus by using the down-link control channel.

Figure 7:
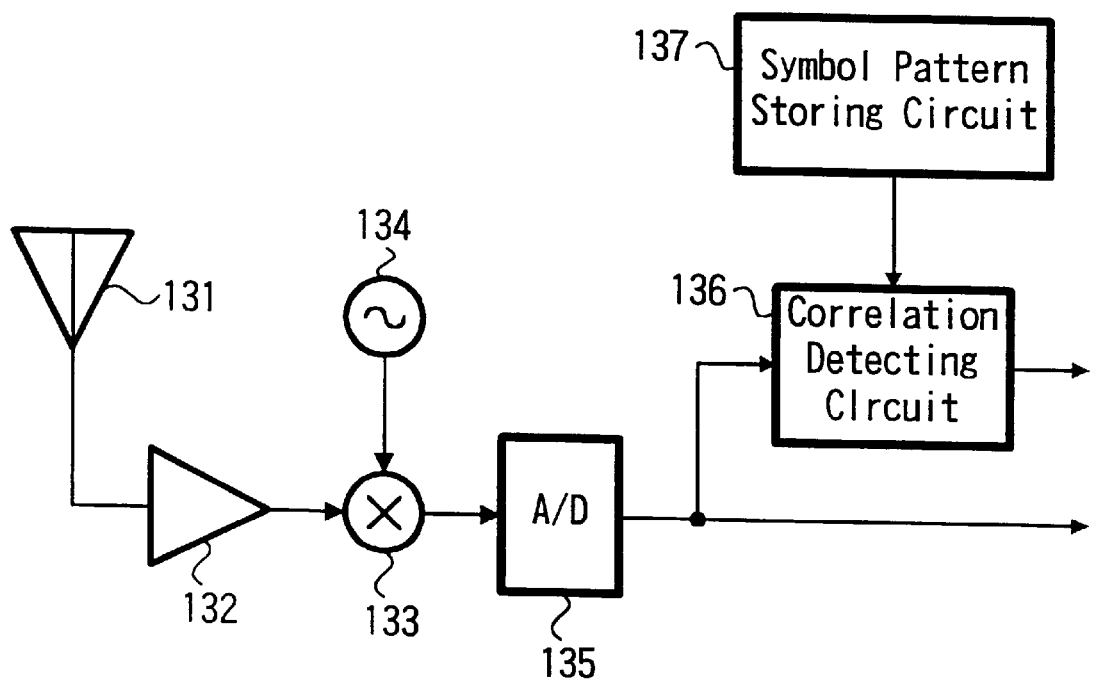
FIG. 7 is a block diagram showing a reception processing according to the embodiment.

FIG. 7 is a diagram showing an arrangement of the base station for detecting the reception timing of the received signal. A signal received by an antenna 131 is supplied to a mixer 133 through a reception amplifier 132. The mixer 133 mixes the received signal with a signal output from an oscillator 134 to convert a predetermined transmission frequency of the received signal into that of an intermediate frequency signal (or a baseband signal). The mixer 133 supplies this frequency-converted signal to an analog/digital converter 135, and the A/D converter 135 samples the signal at a predetermined period and supplies the sampling data to a reception-data demodulating circuit (not shown) and also to a correlation detecting circuit 136 for carrying out a correlation detecting processing.

The correlation detecting circuit 136 is supplied with predetermined known symbol pattern data from a symbol pattern storing circuit 137. The correlation detecting circuit 136 compares the symbol pattern stored therein with the reception data to detect a timing at which correlation between them becomes the highest. The correlation detecting circuit 136 supplies the data indicative of the detected timing at which the correlation becomes the highest to a control unit (not shown) of the base station. The control unit determines the difference between the timing indicated by the supplied data and the reference timing and transmits the control data, used for accelerating (or delaying) the transmission timing of the corresponding terminal apparatus by a time corresponding to the determine difference, to the terminal apparatus.

Specific arrangements of the terminal apparatus (mobile station) and the base station between which communication is carried out in the above-mentioned system arrangement will be described. They will be described on the assumption that a frequency band of 2.0 GHz is employed as the down link from the base station to the terminal apparatus, and a frequency band of 2 GHz is employed as the up link from the terminal apparatus to the base station.

Figure 8:
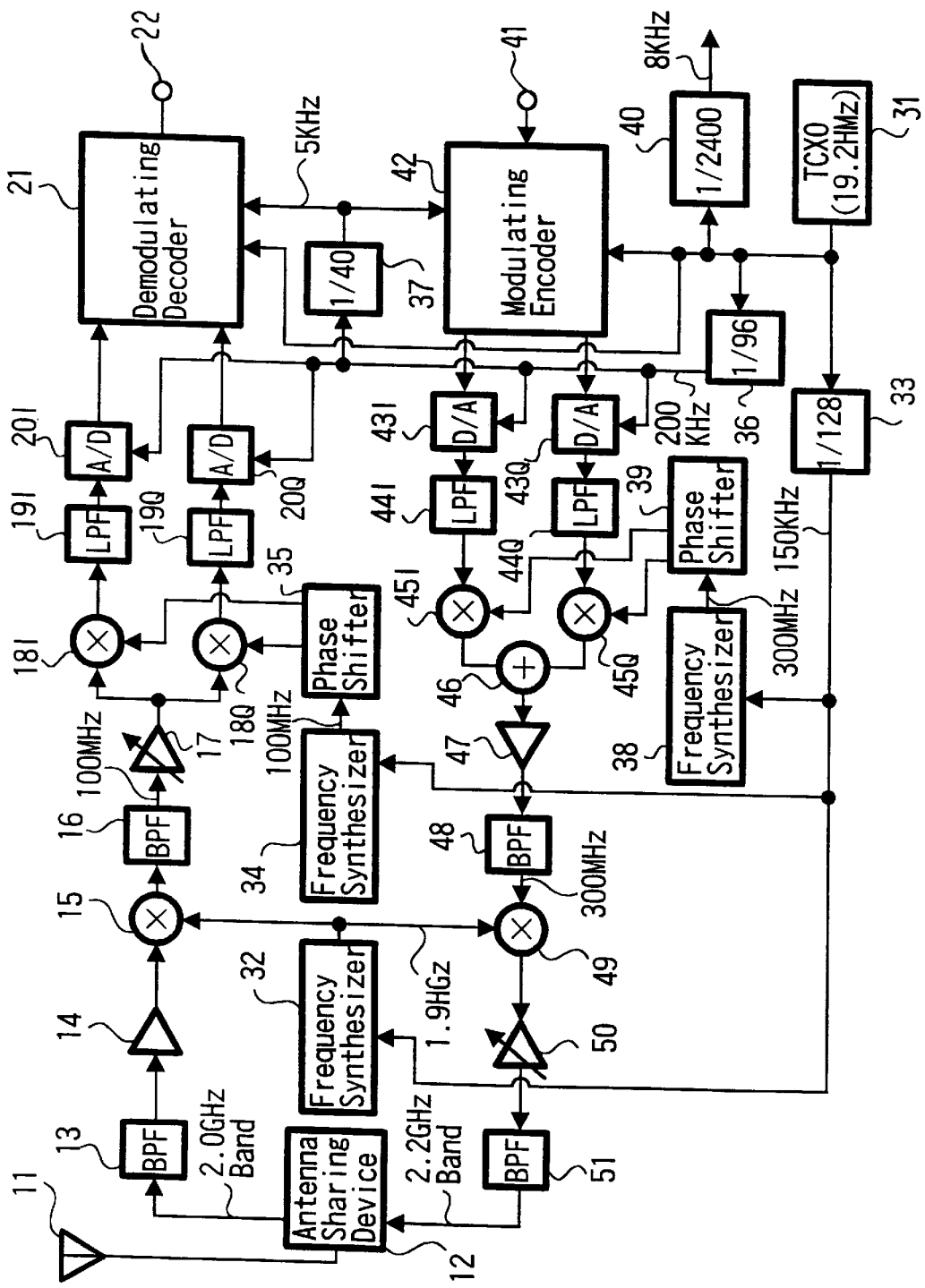
FIG. 8 is a block diagram showing a configuration of a terminal apparatus to which an embodiment of the present invention is applied.

FIG. 8 is a view showing the configuration of the terminal apparatus. Referring first to the reception system, an antenna 11 for both transmission and reception is connected to an antenna sharing device 12, and a band-pass filter 13, a reception amplifier 14, and a mixer 15 are connected in series to a reception signal output side of the antenna sharing device 12. The band-pass filter 13 extracts the 2.0 GHz band. The mixer 15 mixes a frequency signal of 1.9 GHz output by a frequency synthesizer 31 to convert the reception signal into an intermediate frequency signal of a 100 MHz band. The frequency synthesizer 31 is constituted by a PLL circuit (phase locked loop circuit) and is a synthesizer which generates signals at an interval of 150 kHz (i.e., the interval of one band slot) in a 1.9 GHz band using 150 kHz generated by dividing 19.2 MHz output from a temperature compensated reference oscillator (TCXO) 32 by a 1/128 frequency divider 33 as a reference. Other frequency synthesizers used in this terminal apparatus to be described later are also similarly constituted by a PLL circuit.

The intermediate frequency signal output by the mixer 15 is supplied to two mixers 18I and 18Q for demodulation through a band-pass filter 16 and a variable gain amplifier 17. Further, a 100 MHz frequency signal output by a frequency synthesizer 34 is converted by a phase shifter 35 into two series of signals at a 90 deg. phase shift, and one of the two series of frequency signals is supplied to the mixer 18I and the other is supplied to the mixer 18Q to be mixed with the intermediate frequency signal, thereby extracting I- and Q- components included in the received data. The frequency synthesizer 34 is a synthesizer which generates a signal in a 100 MHz band using 150 kHz generated as a result of the frequency division at the 1/128 frequency divider 33 as a reference.

The extracted I component is supplied to an analog-to-digital converter 20I through a low-pass filter 19I to be converted into digital I data. The extracted Q component is supplied to an analog-to-digital converter 20Q through a low-pass filter 19Q to be converted into digital Q data. Each of the analog-to-digital converters 20I and 20Q uses 200 kHz generated by dividing 19.2 MHz output by the TCXO 32 using a 1/96 frequency divider 36 as a clock for conversion.

The digital I data and the digital Q data output by the analog-to-digital converters 20I and 20Q are supplied to a demodulator/decoder 21 to obtain decoded reception data at a terminal 22. 19.2 MHz output by the TCXO 32 is supplied as it is to the demodulator/decoder 21 as a clock, and 5 kHz generated by dividing 200 kHz output by the 1/96 frequency divider 36 using a 1/40 frequency divider 37 is supplied thereto as a clock. This 5 kHz clock is used for generating slot timing data. Specifically, while one time slot is 200 μsec in the present embodiment as described above, one period of the signal having a frequency of 5 kHz is 200 μsec., and the slot timing data is generated in synchronization with this 5 kHz signal.

Referring now to the configuration of the transmission system of the terminal apparatus, transmission data obtained at a terminal 41 is supplied to a modulator/encoder 42 to perform a process of encoding and modulation for transmission, thereby generating digital I data and digital Q data for transmission. 19.2 MHz output by the TCXO 32 is supplied as it is to the modulator/encoder 42 as a clock, and 5 kHz generated as a result of the frequency division at the 1/40 frequency divider 37 is supplied thereto as data for generating the slot timing. The digital I data and the digital Q data output by the modulator/encoder 42 are supplied to digital-to-analog converters 43I and 43Q to be converted into an analog I signal and an analog Q signal, and the I signal and the Q signal as a result of the conversion are supplied to mixers 45I and 45Q through low-pass filters 44I and 44Q. Further, a 300 MHz frequency signal output by a frequency synthesizer 38 is converted by a phase shifter 39 into two series of signals at a 90 deg. phase shift, and one of the two series of frequency signals is supplied to the mixer 45I and the other is supplied to the mixer 45Q to be mixed with the I signal and the Q signal, respectively. This provides signals in a 300 MHz band which are subjected to orthogonal modulation at an adder 46 into a signal of one series. The frequency synthesizer 38 is a synthesizer which generates a signal in a 300 MHz band using 150 kHz generated as a result of the frequency division at the 1/128 frequency divider 33 as a reference.

The signal modulated to the 300 MHz band output by the adder 46 is supplied to a mixer 49 through a transmission amplifier 47 and a band-pass filter 48, and the 1.9 GHz band frequency signal output by the frequency synthesizer 31 is mixed therewith to convert it into a transmission frequency in a 2.2 GHz band. The transmission signal which has been subjected to frequency conversion into this transmission frequency is supplied to the antenna sharing device 12 through a transmission amplifier (variable gain amplifier) 50 and a band-pass filter 51 to be transmitted on a wireless basis from the antenna 11 connected to the antenna sharing device 12. The transmission output is adjusted by controlling the gain of the transmission amplifier 50. For example, the control of the transmission output is performed based on output control data received from the base station side.

The 19.2 MHz signal output by the TCXO 32 is supplied to a 1/2400 frequency divider 40 to be converted into an 8 kHz signal which 8kHz signal is in turn supplied to a circuit in an audio processing system (not shown). That is, in the terminal apparatus of the present embodiment, an audio signal transmitted to and from the base station is sampled at 8 kHz (or oversampled at a frequency which is a multiple thereof), so that the 1/2400 frequency divider 40 provides clocks required for circuits for processing audio data such as an analog-to-digital converter and a digital-to-analog converter for an audio signal or a digital signal processor (DSP) for compression and decompression of audio data.

Figure 9:
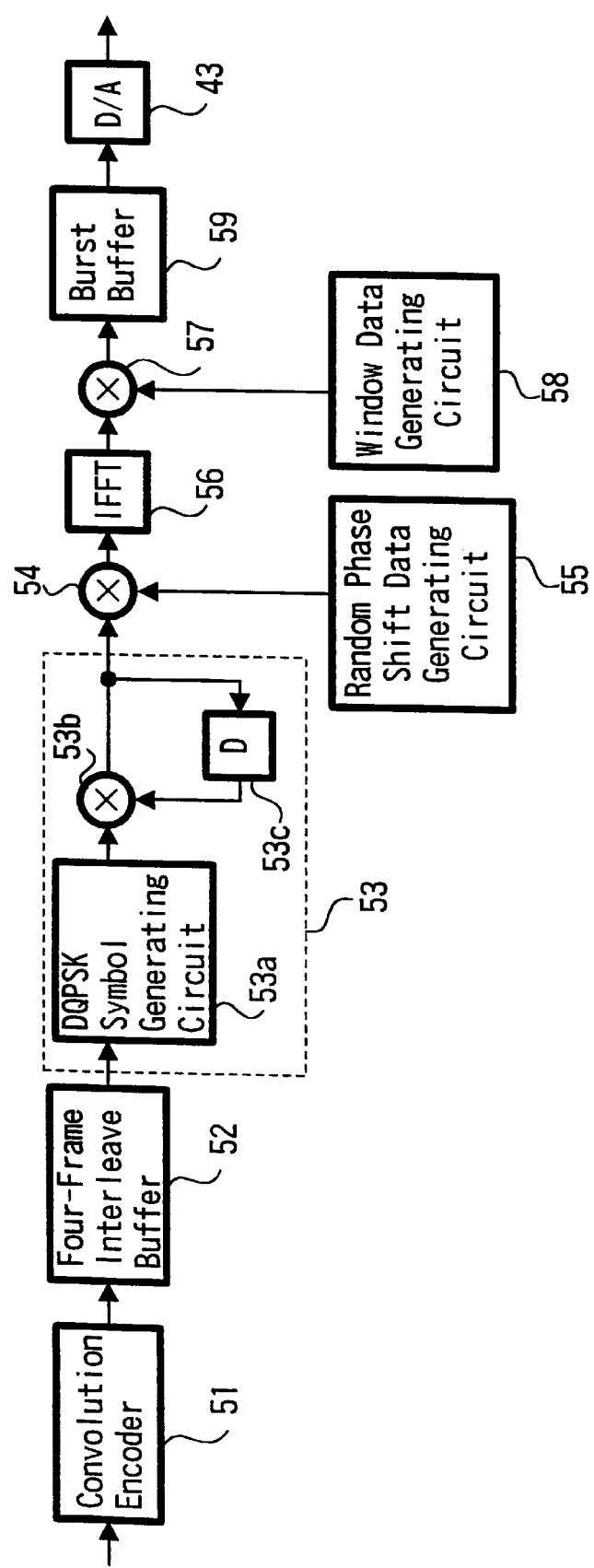
FIG. 9 is a block diagram showing a configuration of an encoder of the terminal apparatus in the embodiment shown in FIG. 8.

A description will now be made on the detailed configuration of an encoder and neighborhood thereof in the transmission system of the terminal apparatus having such a configuration with reference to FIG. 9. Transmission data is supplied to a convolutional encoder 51 to be subjected to convolutional encoding. For example, this convolutional encoding is performed on the basis that constraint length k=7 and encoding ratio R=⅓. The output of the convolutional encoder 51 is supplied to a 4-frame interleave buffer 52 to interleave the data across four frames (20 msec.). The output of the interleave buffer 52 is supplied to a DQPSK encoder 53 to perform DQPSK modulation. Specifically, based on the supplied data, a DQPSK symbol generation circuit 53a generates a symbol corresponding thereto which is supplied to one of the inputs of a multiplier 53b. The multiplication output of the multiplier 53b is delayed by a delay circuit 53c by one symbol and is returned to the other input to perform the DQPSK modulation. The DQPSK-modulated data is supplied to a multiplier 54 where a process is performed to multiply the modulated data by random phase-shift data output by a random phase-shift data generation circuit 55. Thus, the apparent phase of the data is randomly varied.

Then, the output of the multiplier 54 is supplied to an inverse fast Fourier transformation circuit (inverse FFT circuit) 56, and the inverse FFT circuit 56 converts data on a frequency base into the data on time base through the calculation using the inverse fast Fourier transformation to obtain a so-called multi-carrier signal including 22 subcarriers at a 6.25 kHz interval obtained by modulation. The IFFT circuit that carries out the inverse fast Fourier transformation can be relatively simply implemented with a configuration that allows subcarriers in a quantity which is a power of 2. The IFFT circuit 56 used in the present embodiment has a capability of generating 32 subcarriers which is $2^5$ and, at the process of transmitting the information channel, outputs a signal obtained by modulating data to 22 successive subcarriers of them.

The modulation rate for the transmission data processed by the IFFT circuit 56 in the present embodiment is set to 200 kHz, and a process is performed to convert a signal at the modulation rate of 200 kHz into 32 multi-carriers which become $$200 \text{ kHz} \div 32 = 6.25 \text{ kHz}.$$

Thus, a multi-carrier signal at the 6.25 kHz interval (12.5 kHz interval in case of the up link control channel) is obtained.

Figures 10A, 10B:
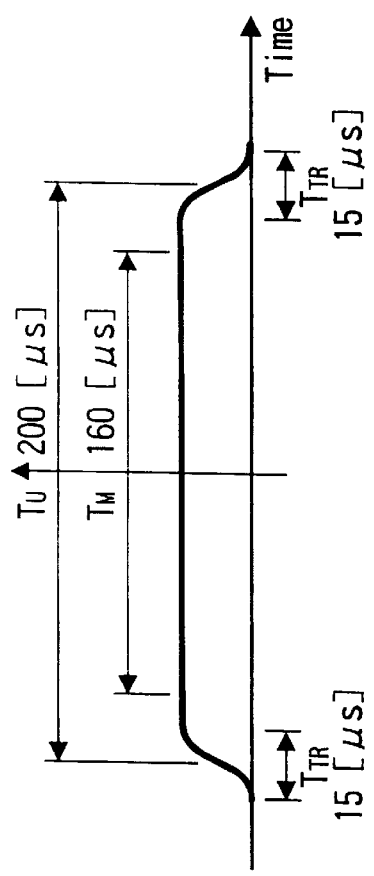
FIGS. 10A and 10B are waveform diagrams showing an example of window data.

The multi-carrier signals converted by the inverse fast Fourier transformation into that on the time base is supplied to a multiplier 57 to be multiplied by a time waveform output by a window data generation circuit 58. As shown in FIG. 10A, for example, this time waveform is a waveform having a length $T_u$ of about 200 μsec. (i.e., one time slot period) of one wave at the transmitting side. However, the level of the waveform varies gently on both ends $T_{TR}$ (about 15 μsec.) thereof and, as shown in FIG. 10B, the waveform partially overlaps adjacent time waveforms when the time waveform is multiplied.

Referring again to FIG. 9, the signal which has been subjected to multiplication of the time waveform at the multiplier 57 is supplied to a digital-to-analog converter 43 (corresponding to the digital-to-analog converters 43I and 43Q in FIG. 8) through a burst buffer 59 to be converted into an analog signal using 200 kHz as a clock for conversion.

Figure 11:
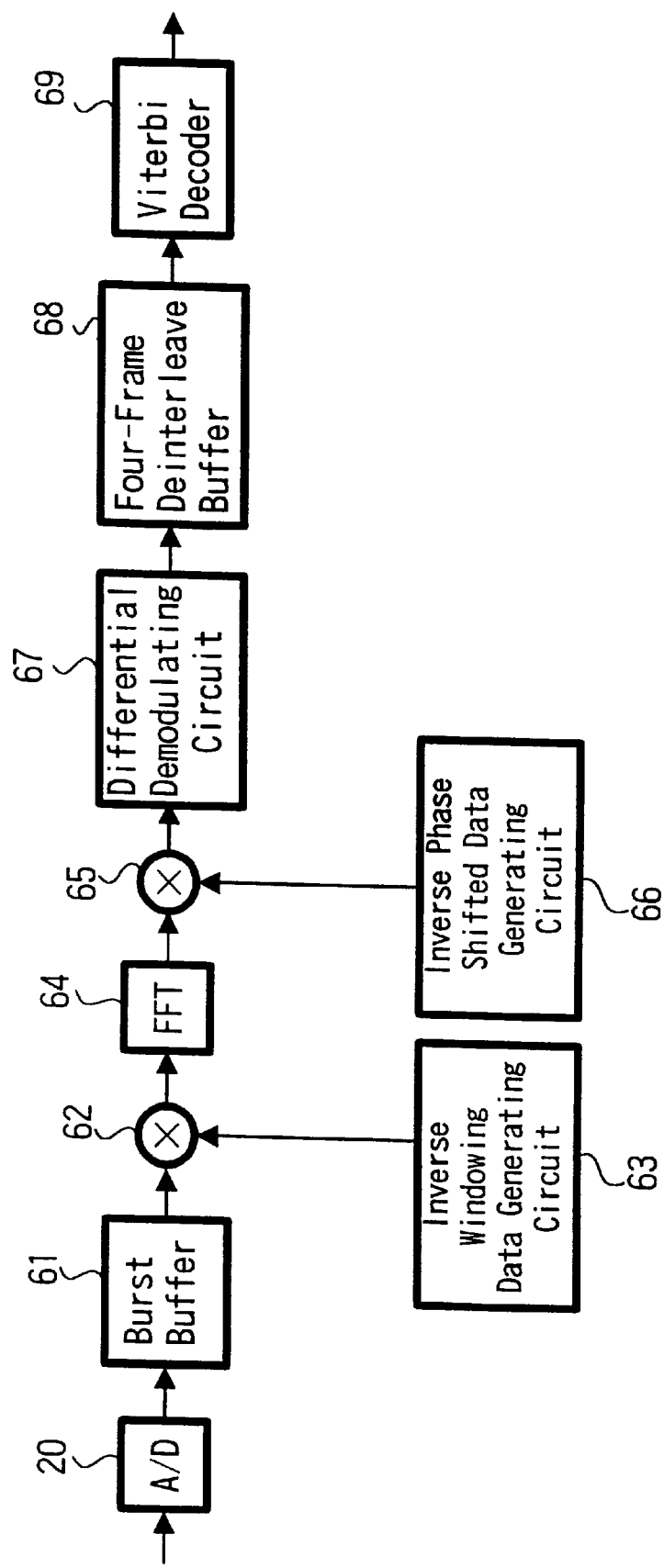
FIG. 11 is a block diagram showing a configuration of a decoder of the terminal apparatus of the embodiment in FIG. 4.

The detailed configuration of a decoder and neighborhood thereof in the reception system of the terminal apparatus according to the present embodiment will be described with reference to FIG. 11. Digital data which has been converted by an analog-to-digital converter 20 (corresponding to the analog-to-digital converters 20I and 20Q in FIG. 8) using a clock of 200 kHz is supplied to a multiplier 62 through a burst buffer 61 to be multiplied by a time waveform output by a reverse window data generation circuit 63. The time waveform multiplied at the reception is a time waveform which has a configuration as shown in FIG. 10A but has a length $T_M$ of 160 μsec. to be shorter than that at the transmission.

The reception data multiplied by the time waveform is supplied to an FFT circuit 64 where it is subjected to a process of converting data on the time base into the data on the frequency base through a fast Fourier transformation process. Thus, the time-series data transmitted after being modulated into 22 subcarriers at the 6.25 kHz interval is converted into data of respective subcarriers. Like the conversion process at the IFFT circuit in the transmission system, the conversion process here employs a capability of processing 32 subcarriers which is $2^5$, and the data modulated into 22 successive subcarriers out of them is converted and output. The modulation rate for the transmission data processed by the FFT circuit 64 in the present embodiment is 200 kHz, and a process of converting a multi-carrier signal at the 6.25 kHz interval can be performed because 32 multi-carriers can be processed, i.e., 200 kHz÷32=6.25 kHz.

The reception data which has been subjected to the fast Fourier transformation at the FFT 64 is supplied to a multiplier 65 where it is multiplied by reverse random phase shift data (this data is data that varies in synchronization with the random phase shift data at the transmitting side) output by a reverse random phase shift data generation circuit 66 to be returned to data having the original phase.

The data returned to the original phase is supplied to a differential demodulation circuit 67 to be subjected to differential demodulation, and the data which has been subjected to the differential demodulation is supplied to a 4-frame deinterleave buffer 68 where the data interleaved across four frames at the time of transmission is returned to the original data arrangement. The deinterleaved data is supplied to a Viterbi decoder 69 to be subjected to Viterbi decoding. The Viterbi-decoded data is supplied to a subsequent reception data processing circuit (not shown) as decoded reception data.

The configuration of the base station will now be described with reference to FIG. 12. The configuration used in this base station to perform transmission and reception is basically similar to that in the terminal apparatus except for a configuration which is used for achieving multiple access wherein it is connected to a plurality of terminal apparatuses simultaneously.

Figure 12:
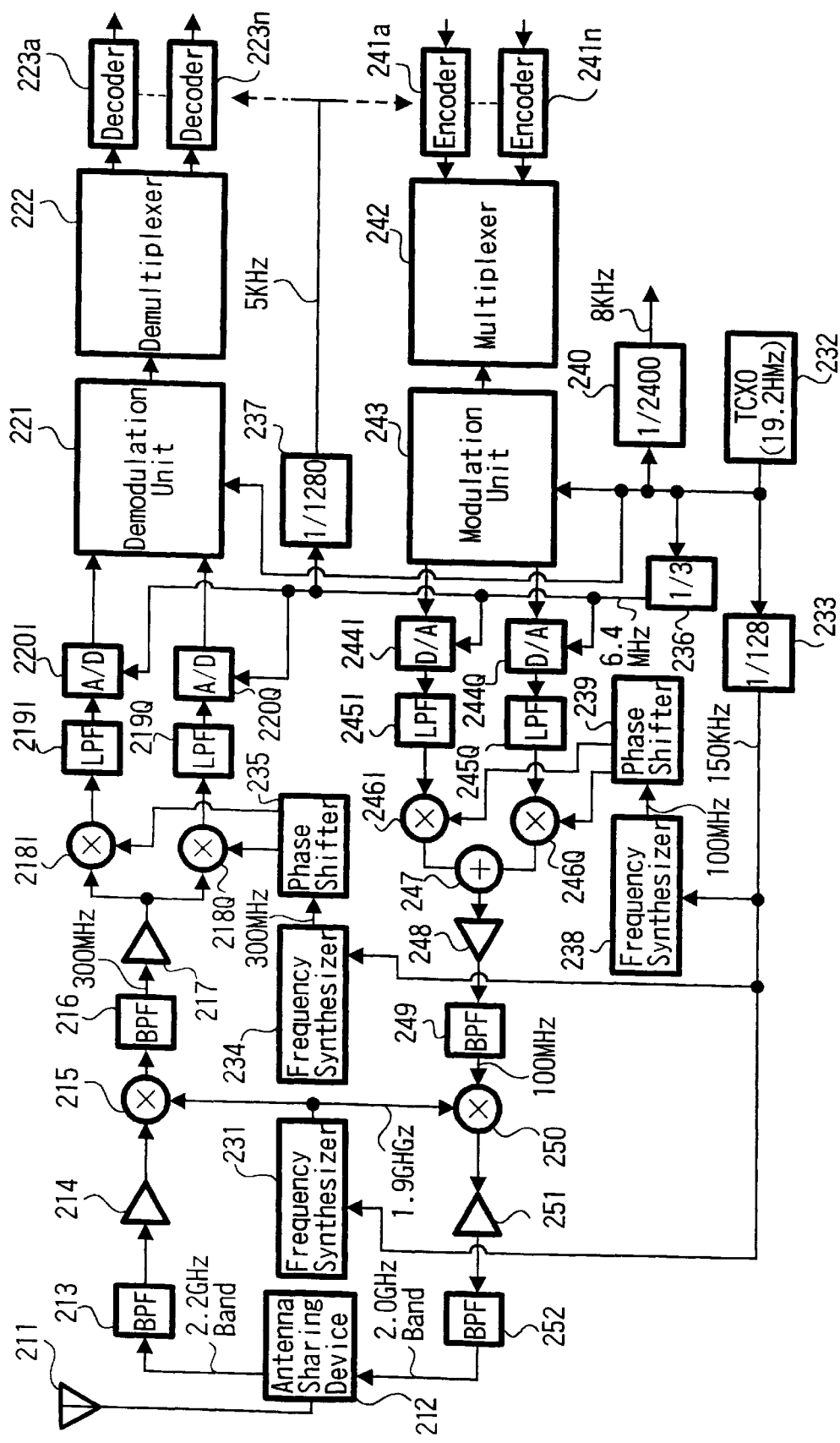
FIG. 12 is a block diagram showing a configuration of a base station to which the embodiment is applied.

Referring first to the configuration of the reception system shown in FIG. 12, an antenna 211 for both transmission and reception is connected to an antenna sharing device 212, and a band-pass filter 213, a reception amplifier 214, and a mixer 215 are connected in series to a reception signal output side of the antenna sharing device 212. The band-pass filter 213 extracts the 2.2 GHz band. The mixer 215 mixes a frequency signal of 1.9 GHz output by a frequency synthesizer 231 to convert the reception signal into an intermediate frequency signal in a 300 MHz band. The frequency synthesizer 231 is constituted by a PLL circuit (phase locked loop circuit) and is a synthesizer which generates a signal at an interval of 150 kHz (i.e., the interval of one band slot) in a 1.9 GHz band using 150 kHz generated by dividing 19.2 MHz output from a temperature compensated reference oscillator (TCXO) 232 by a 1/128 frequency divider 233 as a reference. Other frequency synthesizers used in this base station to be described later are also similarly constituted by a PLL circuit.

The intermediate frequency signal output by the mixer 215 is supplied to two mixers 218I and 218Q for demodulation through a band-pass filter 216 and a reception amplifier 217. Further, a 300 MHz frequency signal output by a frequency synthesizer 234 is converted by a phase shifter 235 into two series of signals at a 90 deg. phase shift, and one of the two series of frequency signals is supplied to the mixer 218I and the other is supplied to the mixer 218Q to be mixed with the intermediate frequency signal, thereby extracting I- and Q- components included in the received data. The frequency synthesizer 234 is a synthesizer which generates a signal in a 300 MHz band using 150 kHz generated as a result of the frequency division at the 1/128 frequency divider 233 as a reference.

The extracted I component is supplied to an analog-to-digital converter 220I through a low-pass filter 219I to be converted into digital I data. The extracted Q component is supplied to an analog-to-digital converter 220Q through a low-pass filter 219Q to be converted into digital Q data. Each of the analog-to-digital converters 220I and 220Q uses 6.4 MHz generated by dividing 19.2 MHz output by the TCXO 232 using a 1/3 frequency divider 236 as a clock for conversion.

The digital I data and the digital Q data output by the analog-to-digital converters 220I and 220Q are supplied to a demodulation unit 221, and the demodulated data is supplied to a demultiplexer 222 to be divided into data from each terminal apparatus. The divided data is separately supplied to decoders 223a, 223b, . . . , 223n prepared in the same number (6 per one band slot) as the terminal apparatuses connected simultaneously. 19.2 MHz output by the TCXO 232 is supplied as it is to the demodulation unit 221, the demultiplexer 222 and the decoders 223a, 223b, . . . , 223n as a clock, and 5 kHz generated by dividing 6.4 MHz output by the 1/3 frequency divider 236 using a 1/1280 frequency divider 237 is supplied thereto as slot timing data.

Referring now to the configuration of the transmission system of the base station, transmission data separately encoded by encoders 241a, 241b, . . . , 241n prepared in the same number as the parties (terminal apparatuses) to communicate simultaneously is synthesized by a multiplexer 242. The output of the multiplexer 242 is supplied to a modulation unit 243 which performs a modulation process for transmission to generate digital I data and digital Q data for transmission. A signal having a frequency of 19.2 MHz and output by the TCXO 232 is supplied as it is to each of the encoders 241a through 241n, the multiplexer 242 and the modulation unit 243 as a clock, and 5 kHz output by the 1/1280 frequency divider 237 is supplied thereto as a clock.

The digital I data and the digital Q data output by the modulation unit 243 are supplied to digital-to-analog converters 244I and 244Q to be converted into an analog I signal and an analog Q signal, and the I signal and the Q signal as a result of the conversion are supplied to mixers 246I and 246Q through low-pass filters 245I and 245Q. Further, a signal having a frequency of 100 MHz and output by a frequency synthesizer 238 is converted by a phase shifter 239 into two series of signals phase-shifted at 90°, and one of the two series of signals is supplied to the mixer 246I and the other is supplied to the mixer 246Q to be mixed with the I signal and the Q signal, respectively. This provides signals in a 100 MHz band which are subjected to orthogonal modulation at an adder 247 into one series of signal. The frequency synthesizer 238 is a synthesizer which generates a signal in a 100 MHz band using 150 kHz generated as a result of the frequency division at the 1/128 frequency divider 233 as a reference.

The signal modulated to the 100 MHz band output by the adder 247 is supplied to a mixer 250 through a transmission amplifier 248 and a band-pass filter 249, and the 1.9 GHz band frequency signal output by the frequency synthesizer 231 is mixed therewith to convert it into a transmission frequency in a 2.0 GHz band. The transmission signal which has been subjected to frequency conversion into this transmission frequency is supplied to the antenna sharing device 212 through a transmission amplifier 251 and a band-pass filter 252 to be transmitted on a wireless basis from the antenna 211 connected to the antenna sharing device 212.

The 19.2 MHz signal output by the TCXO 232 is supplied to a 1/2400 frequency divider 240 to be converted into an 8 kHz signal which 8 kHz signal is in turn supplied to a circuit in an audio processing system (not shown). That is, in the base station of the present embodiment, an audio signal transmitted to and from a terminal apparatus is sampled at 8 kHz (or oversampled at a frequency which is a multiple thereof), so that the 1/2400 frequency divider 240 provides clocks required for circuits for processing audio data such as an analog-to-digital converter and a digital-to-analog converter for an audio signal or a digital signal processor (DSP) for compression and decompression of audio data.

Figure 13:
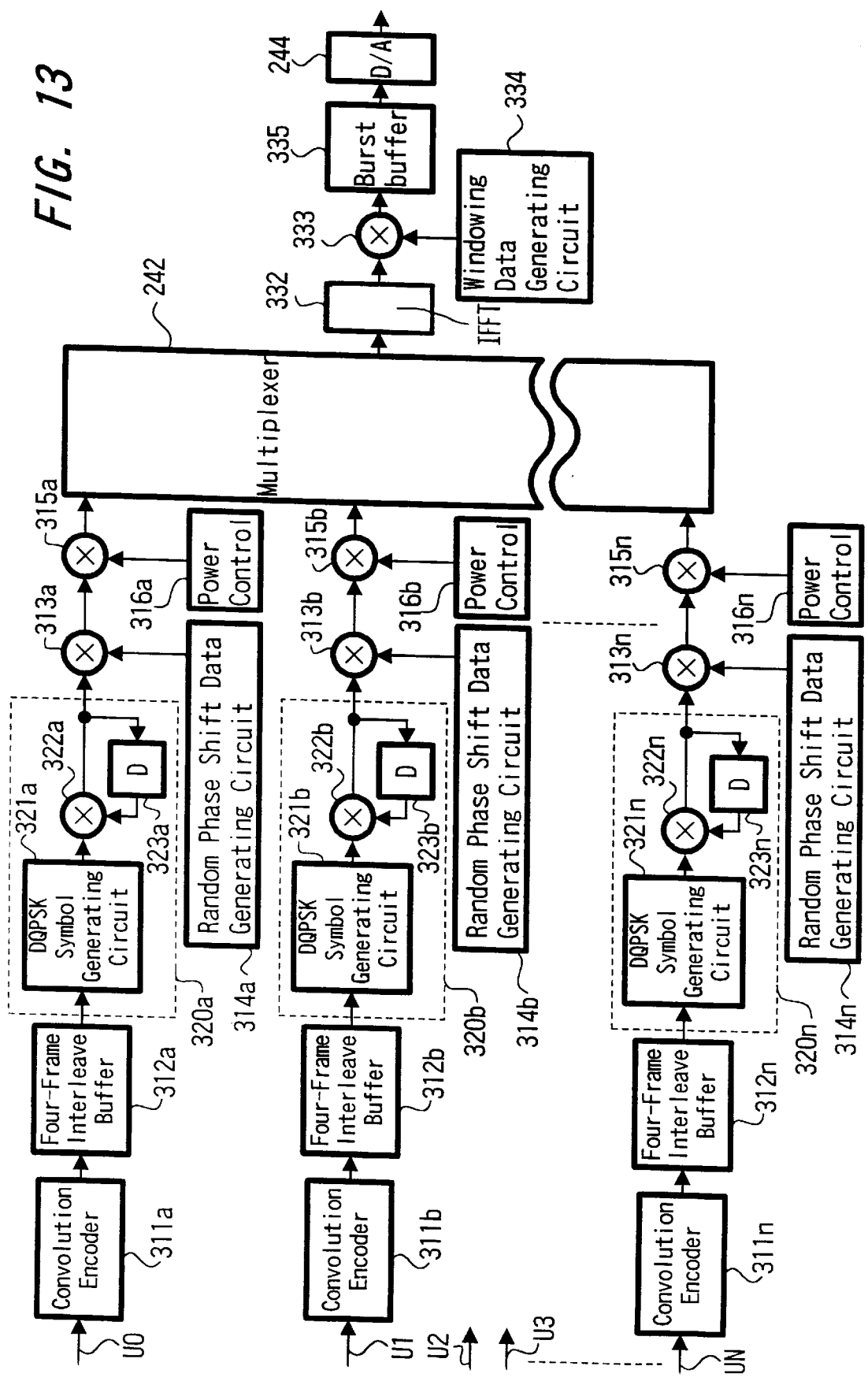
FIG. 13 is a block diagram showing a configuration for a modulation process on the base station of the embodiment in FIG. 12.

A description will now be made on the details of a configuration for encoding and modulating transmission data at the base station with reference to FIG. 13. It is assumed here that simultaneous multiple access is established to N (N is an arbitrary number) terminal apparatuses (users). Signals U0, U1, ..., UN to be transmitted to the user at each terminal apparatus are respectively supplied to separate convolutional encoders 311a, 311b, ... 311n to be subjected to convolutional encoding separately. For example, this convolutional encoding is performed on the basis that constraint length k=7 and encoding ratio R=⅓.

The data which have been subjected to convolutional encoding in respective systems are respectively supplied to 4-frame interleave buffers 312a, 312b, ..., 312n to interleave the data across four frames (20 msec.). The outputs of the respective interleave buffers 312a, 312b, ..., 312n are supplied to respective DQPSK encoders 320a, 320b, ..., 320n to perform DQPSK modulation. Specifically, based on the supplied data, DQPSK symbol generation circuits 321a, 321b, ..., 321n generate symbols corresponding thereto which are supplied to an input of multipliers 322a, 322b, ..., 322n. The multiplication outputs of the multipliers 322a, 322b, ..., 322n are delayed by respective delay circuits 323a, 323b, ..., 323n by one symbol and are returned to the other inputs to perform the DQPSK modulation. The DQPSK-modulated data are respectively supplied to multipliers 313a, 313b, ..., 313n where a process is performed to multiply the modulated data by random phase-shift data separately output by random phase-shift data generation circuits 314a, 314b, ..., 314n. Thus, the apparent phase of the data is randomly varied.

Then, the output of each of the multipliers 313a, 313b, ..., 313n is supplied to a multiplexer 242 to be synthesized therein. During the synthesis at the multiplexer 242 of the present embodiment, the positions of the frequencies to be synthesized can be switched using 150 kHz as a unit, such switching is controlled to switch the frequency of a burst signal transmitted to each terminal apparatus. That is, while frequency switching on a band slot basis referred to as the frequency hopping is performed in the present embodiment as shown in FIG. 2, such frequency switching is achieved by switching the processes performed during the synthesis at the multiplexer 242.

The data synthesized by the multiplexer 242 is supplied to an IFFT circuit 332 which converts a signal on a frequency base into a signal on the time base through the calculation using the inverse fast Fourier transformation to obtain time series data formed of the multi-carrier signal obtained by modulating data into 22 subcarriers at the 6.25 kHz interval per band slot. The data obtained by the inverse fast Fourier transformation is supplied to a multiplier 333 to be multiplied by a time waveform output by a window data generation circuit 334. As shown in FIG. 10A, this time waveform is a waveform having a length $T_U$ of about 200 μsec. (i.e., one time slot period) of one wave at the transmitting side. However, the level of the waveform varies gently on both ends $T_{TR}$ (about 15 μsec.) thereof and, as shown in FIG. 10B, the waveform partially overlaps adjacent time waveforms when the time waveform is multiplied.

The signal which has been subjected to multiplication of a time waveform at the multiplier 333 is supplied to a digital-to-analog converter 244 (corresponding to the converters 244I and 244Q in FIG. 12) through a burst buffer 335 to be converted into an analog I signal and an analog Q signal which are transmitted with the configuration shown in FIG. 12.

Figure 14:
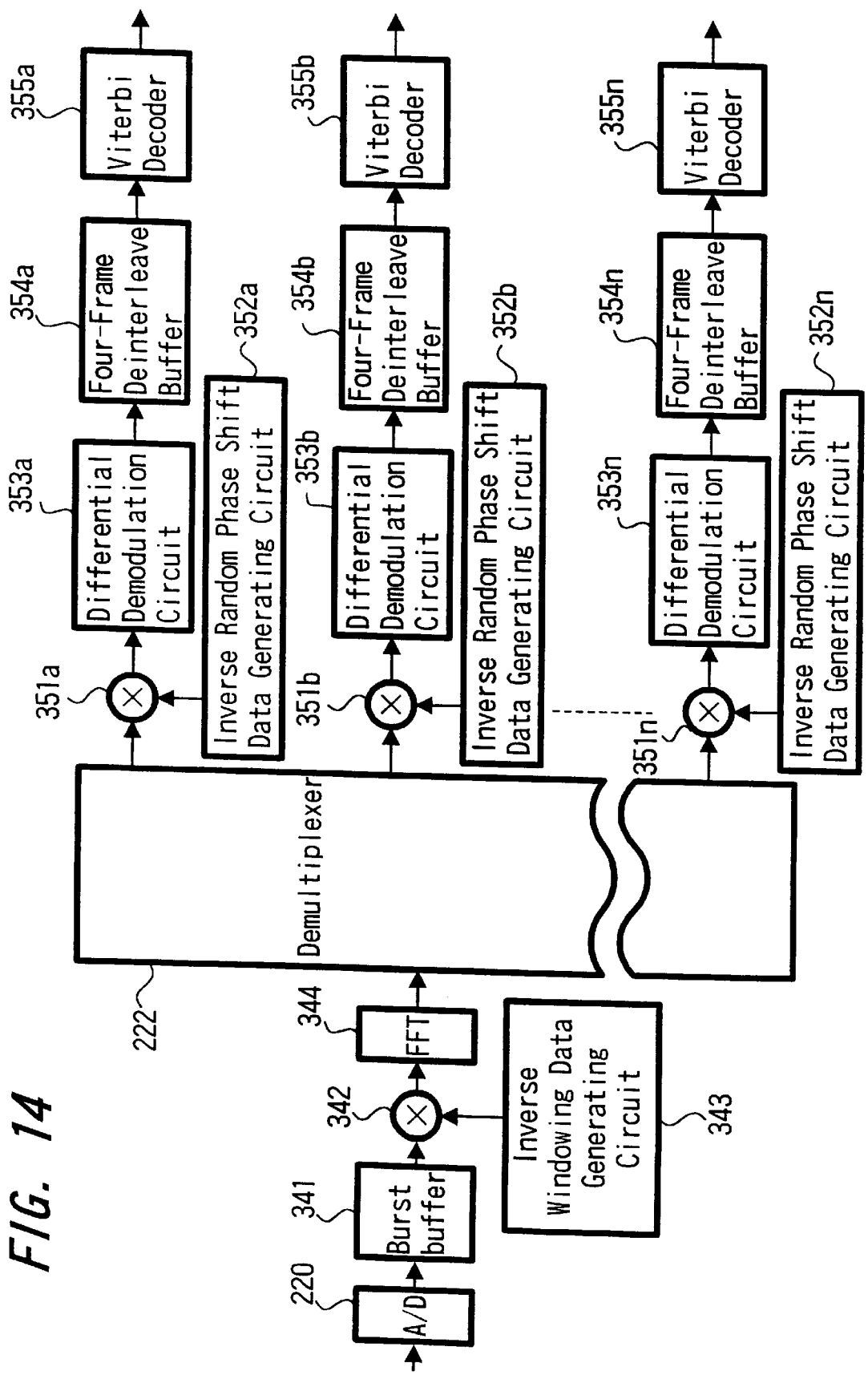
FIG. 14 is a block diagram showing a configuration for a demodulation process on the base station of the embodiment in FIG. 8.

Next, the details of a configuration for demodulating and decoding reception data at the base station will be described with reference to FIG. 14. The digital I data and the digital Q data which have been converted by an analog-to-digital converter 220 (corresponding to the analog-to-digital converters 220I and 220Q in FIG. 8) is supplied to the multiplier 342 through a burst buffer 341 to be multiplied by a time waveform output by a reverse window data generation circuit 343. This time waveform is a time waveform which has a configuration as shown in FIG. 6A but has a length $T_M$ of 160 μsec. to be shorter than that at the transmission.

The reception data multiplied by the time waveform is supplied to an FFT circuit 344 where it is subjected to a process of converting data on the time base into data on the frequency base through a fast Fourier transformation process. Thus, the data transmitted after being modulated into 22 subcarriers at the 6.25 kHz intervals per band slot is converted into data of the respective subcarriers. This data which has been subjected to the fast Fourier transformation is supplied to the demultiplexer 222 to obtain data which is divided by a number corresponding to the number of terminal apparatuses for which simultaneous multiple access is provided. During the division at the multiplexer 222 of the present embodiment, the positions of the frequencies to be divided can be switched using 150 kHz as a unit, such switching is controlled to switch the frequency of a burst signal transmitted from each terminal apparatus. That is, while frequency switching on a band slot basis referred to as the frequency hopping is periodically performed in the present embodiment as shown in FIG. 9 and etc., such frequency switching at the transmitting side is achieved by switching the processes performed during the division at the demultiplexer 222.

The respective reception data which has been divided by the demultiplexer 222 are separately supplied to multipliers 351a, 351b, ..., 351n provided in a number N of the terminal apparatuses for which simultaneous multiple access is provided. At the multipliers 351a, 351b, ..., 351n, the data is multiplied by reverse random phase shift data (the data is data that varies in synchronization with the random phase shift data at the transmitting side) output by reverse random phase shift data generation circuits 352a, 352b, ..., 352n to be returned to data having the original phase in the respective systems.

The data is supplied to differential demodulation circuits 353a, 353b, ..., 353n to be subjected to differential demodulation, and the data which has been subjected to the differential demodulation is supplied to 4-frame deinterleave buffers 354a, 354b, ..., 354n where the data interleaved across four frames at the time of transmission is returned to the original data arrangement. The deinterleaved data is supplied to Viterbi decoders 355a, 355b, ..., 355n to be subjected to Viterbi decoding. The Viterbi-decoded data are supplied to a subsequent reception data processing circuit (not shown) as decoded reception data.

While in the above embodiment the number of the sub-carriers forming the up-link control channel from the terminal apparatus to the base station is set to half of the number of sub-carriers forming one band slot of other channels such as the information channel or the like to thereby set the frequency intervals between the carriers wider which is twice as much as another frequency of another channel, the frequency interval between the carriers may be set to another frequency interval which is three or four times as wide as that of another channel, for example. As the frequency interval is widened, the information amount which can be transmitted by using the same band becomes less. While the frequency interval may be set to a frequency interval obtained by multiplying a frequency with the number except an integer, when the frequency interval is set to the number obtained by multiplying the frequency with an integer, the transmission and reception processings can be carried out only by a processing of thinning out a part of data in a circuit for processing the information channel or the like and hence can be realized with a simple arrangement.

While in the above embodiment the data modulated to the eleven sub-carriers forming the up-link control channel is subjected to the same processing as that for the data modulated to the sub-carriers forming the information channel, the data transmitted on the up-link control channel may be subjected to a processing which is different from that for the data modulated to the sub-carriers forming the information channel.

Figure 4:
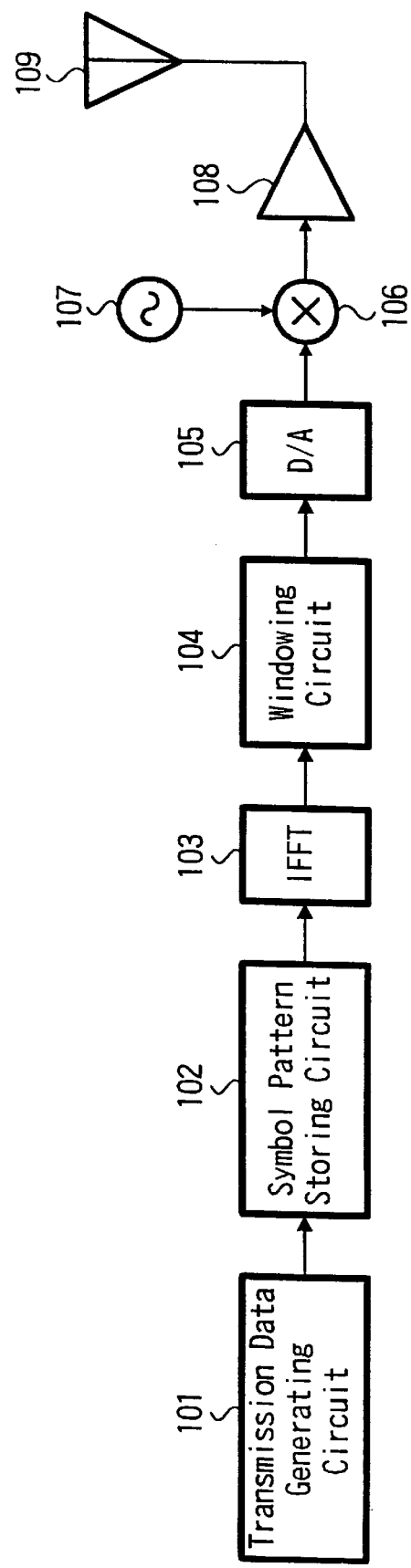
FIG. 4 is a block diagram showing a transmission processing according to an embodiment of the present invention.
Figure 15:
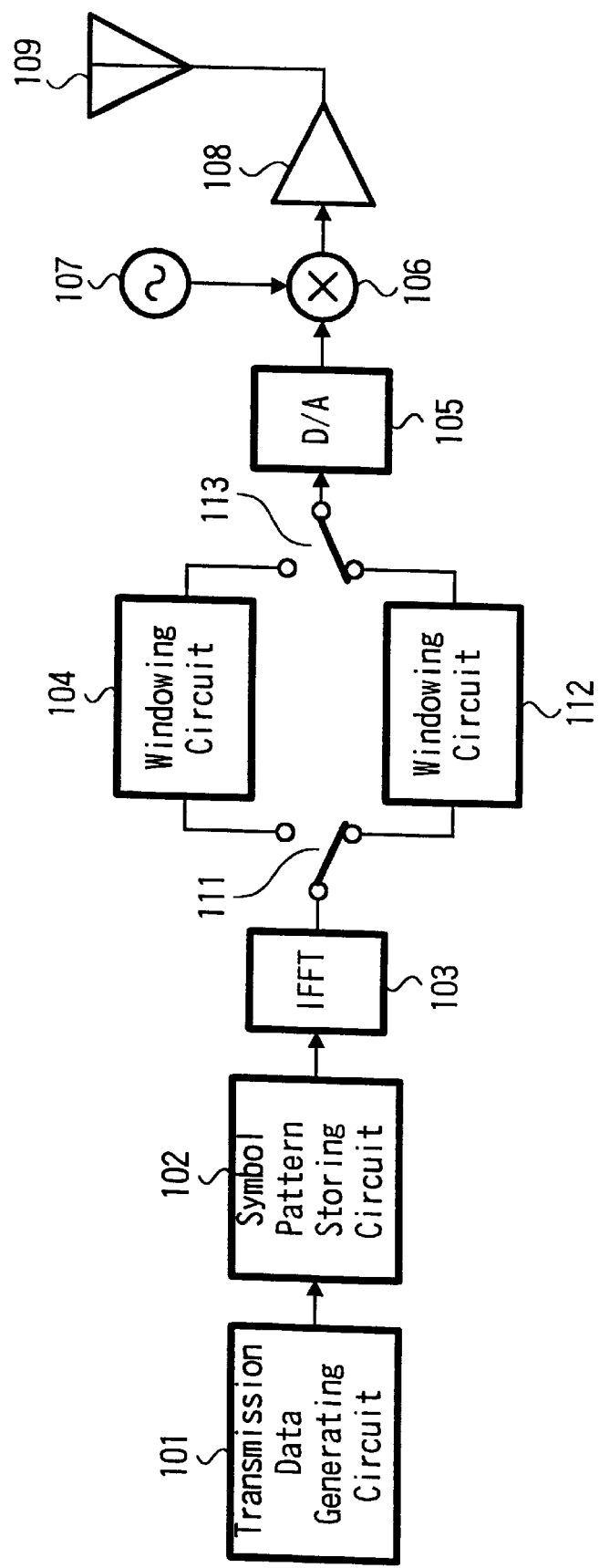
FIG. 15 is a block diagram showing a transmission processing according to another embodiment of the present invention.

FIG. 15 is a diagram showing an example employed when the processing is changed. In FIG. 15, like parts and circuits corresponding to those shown in FIG. 4 are marked with the same reference numerals. A signal output from an IFFT circuit 103 is selectively supplied through a changeover switch 111 to the windowing circuits 104 and 112. In this case, the windowing circuit 104 multiplies the transmission signal on the information channel or the like with the windowing data and, more specifically, multiplies the signal with a windowing data $T_U$ (see FIG. 10A) having a length corresponding to a one time slot period. The windowing circuit 112 multiplies the transmission signal on the up-link control channel with the windowing data and, more specifically, multiplies the signal with a windowing data $T_u$ having a length which is half of one time slot period (though not shown, the windowing data having a period substantially half of that of the windowing data $T_U$ shown in FIG. 10A). In this case, a period when the windowing data is multiplied may be set to a period located at a substantial center of one time slot or a period at the beginning of the one time slot.

The transmission signal multiplied with the windowing data by either of the windowing circuits 104, 112 is supplied through a changeover switch 113 to a digital/analog converter 105. The switches 111, 113 are switches which, when the signal on the up-link control channel is subjected to the transmission processing, switch their connection points to the windowing circuit 112 side and which, when the signal on another channel is subjected to the transmission processing, switch their connection points to the windowing circuit 104 side. Other parts are arranged similarly to the circuit shown in FIG. 4.

Figure 16A:
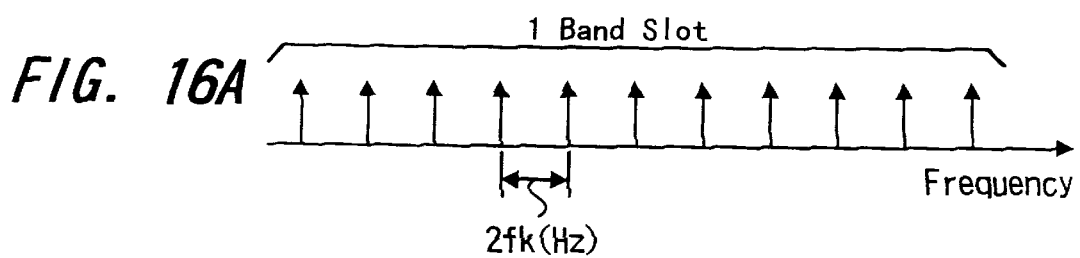
FIGS. 16A and 16B are diagrams used to explain an up-control channel arrangement generated in the transmission processing in the embodiment shown in FIG. 15.
Figure 16B:
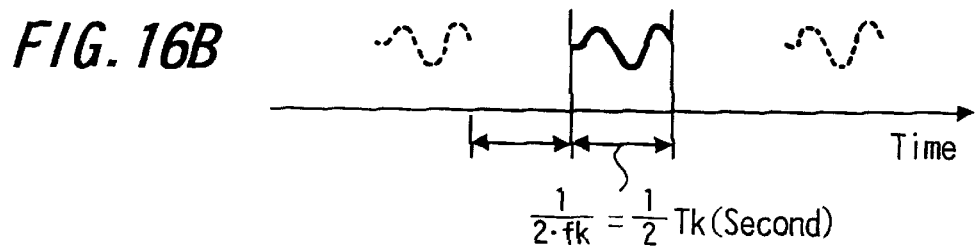

The transmission processing using the arrangement shown in FIG. 15 permits the signal transmitted on the up-link control channel to have an arrangement shown in FIG. 16. Specifically, as shown in FIG. 16A, the signal dispersed to the eleven sub-carriers at an interval of the frequency $2f_k$ (an interval of 12.5 kHz) which is twice as wide as the frequency interval used for the information channel is provided in one band slot and then transmitted. Since the number of subcarriers is the same as that of the example shown in FIG. 3 described in the above embodiment but a period of transmission of data in one time slot is limited to ½ by the windowing data indicating a period of a half length, it is possible to, as shown in FIG. 16B, obtain the data of only $T_k/2$ [sec.] during a period of T [sec.] by converting the signal into time series data on the reception side. As shown by a broken line in FIG. 16B, adjacent data is provided at an interval of $T_k/2$ [sec.].

When the transmission using the up-link control channel is carried out as shown in FIGS. 16A, 16B, a period when the data is transmitted on this up-link control channel is shortened during one time slot, and even if the data is transmitted with the timing of the transmission from the terminal apparatus being comparatively and considerably displaced from the reference timing set by the base station, the possibility that the base station receives the data during the adjacent time slots is reduced. Therefore, even if the time alignment processing is not carried out, it is possible to secure orthogonality of the slot timing and hence the present invention is suitable for transmission of the access request data which cannot be subjected to the time alignment processing, for example.

While in the embodiment described with reference to FIGS. 15, 16A and 16B the data transmission period in one time slot period on the up-link control channel is limited to about ½, the data transmission period may be limited to a period of another length, e.g., ⅓ or ¼ of one time slot. If the length of the period is set to an inverse number of a multiple of an integer, then it is possible to realize a comparatively simple transmission and reception processing.

Figure 17:
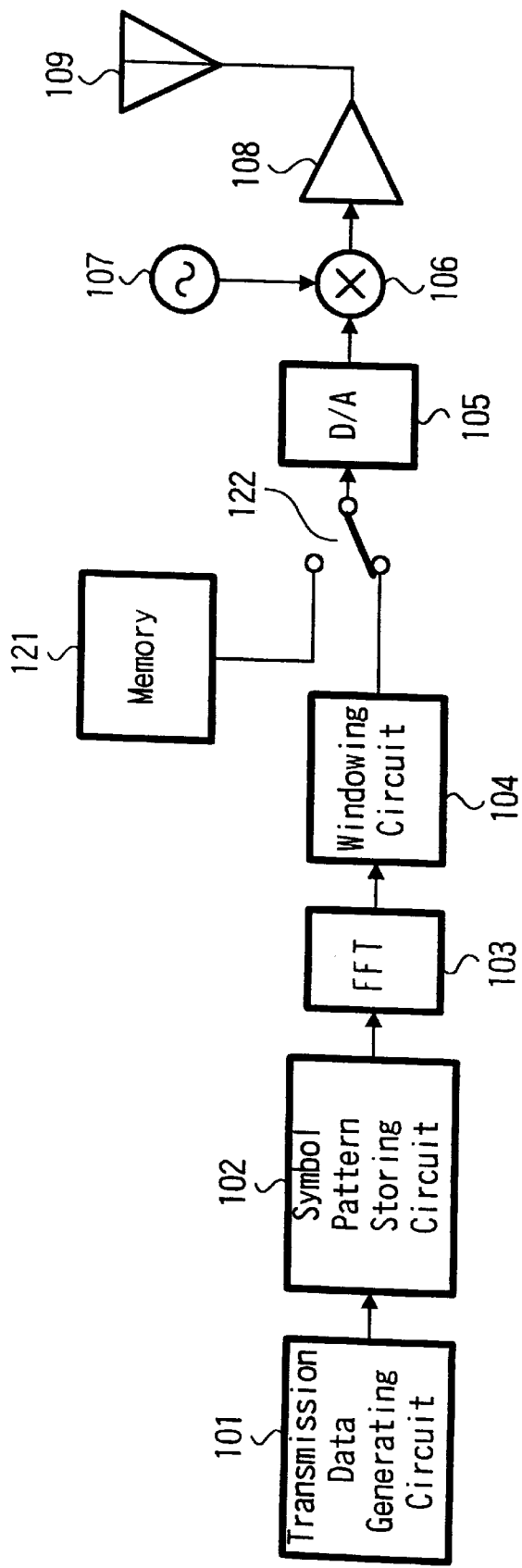
FIG. 17 is a block diagram showing a transmission processing according to another embodiment of the present invention.

The predetermined known symbol pattern to be transmitted on the up-link control channel and so on, instead of subjecting the known symbol pattern to the transmission processing, may be stored in a memory as the data obtained by subjecting the known symbol pattern to the fast Fourier transform, the data stored in the memory being read out therefrom upon transmission. Specifically, as shown in FIG. 17, the data obtained by subjecting the known symbol pattern to the fast Fourier transform is stored in a transmission memory 121. A signal output from a windowing circuit 104 and a signal from the memory 121 are supplied to a change-over switch 122 and then selectively supplied from the changeover switch 122 to a digital/analog converter 105. Only at a timing at which the known data is transmitted, the change-over switch 122 switches its connection point to the memory 121 side, and at other timings the change-over switch 122 switches its connection point to the windowing circuit 104 side. In FIG. 17, other arrangements are is similar to that shown in FIG. 4. Like parts and circuits corresponding to those in FIG. 4 are marked with the same reference numbers and hence need not be described in detail.

The transmission processing using the arrangement shown in FIG. 17 allows the predetermined data of the signal transmitted on the up-link control channel to be prevented from being subjected to the transmission processing carried out by the FFT circuit 103 and the windowing circuit 104. Therefore, the transmission processing for the up-link control channel can be carried out with a simple processing to that extent, and power required for the transmission processing can be reduced.

While the frequency interval of the sub-carriers only on the up-link control channel is widened, the frequency interval of the sub-carriers on another channel may be set similarly wider. For example, the frequency interval of the sub-carriers on the down-link control channel from the base station to the terminal apparatus may be set wider than that on the information channel.

The values of the frequencies, the time, and the encoding ratios mentioned in the above-described embodiment are only illustrative, and the present invention is not limited to the above-described embodiment. Further, it is obvious that communication systems other than the band division multiple access (BDMA system) as described with reference to FIGS. 8 through 10 may be used.

According to the present invention, the frequency interval of the sub-carriers of a channel for acquiring an access right among up link channels from a terminal apparatus to a base station is made longer than the frequency interval of the sub-carriers of other channels. This makes it possible to transmit a signal for acquiring an access right to the base station in a relatively good state of communication and to reliably transmit such a signal to the base station even when a time alignment process or the like is not carried out.

In this case, by selecting an integer multiple of the frequency interval of the sub-carriers of other channels as the frequency interval of the sub-carriers of a channel for acquiring an access right, processes of transmitting and receiving the channel for acquiring an access right can be easily performed using circuits commonly used for transmission and reception processes over other channels.

In the above communication system between the terminal apparatus and the base station, a plurality of transmission bands are prepared and a signal of each transmission band is divided by a predetermined time unit to form time slots. A burst signal is modulated by intermittently dispersing the data to sub-carriers in one transmission band during time slot periods of the predetermined number.

When the communication system according to the present invention is applied, the time slot period of the channel used for obtaining the access right is set to an inverse number of a multiple of the time slot period of other another channel. Therefore, it is possible to more reliability carry out the communication of the data used for obtaining the access right.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication method for communication between a plurality of subscribers and a plurality of base stations in a multi-carrier format using a plurality of sub-carriers, comprising the steps of:

setting an interval among said plurality of sub-carriers to a first frequency interval when information of a first kind is communicated; and setting an interval among said plurality of sub-carriers to a second frequency interval wider than said first frequency interval when information of a second kind is communicated, wherein said information of said first kind is general information and said information of said second kind is communication control information.

2. A communication method for communicating between a plurality of subscribers and a plurality of base stations in a multi-carrier format using a plurality of sub-carriers, comprising the steps of:

setting an interval among said plurality of sub-carriers to a first frequency interval when general information is communicated; and setting an interval among said plurality of sub-carriers to a second frequency interval wider than said first frequency interval when communication control information is communicated.

3. The communication method according to claim 2, wherein said communication control information is an access priority request signal transmitted from one of said plurality of subscribers to one of said plurality of base stations.

4. The communication method according to claim 2, wherein said second frequency interval is N times, N being an integer, as wide as said first frequency interval.

5. The communication method according to claim 2, wherein said second frequency interval is set by one of each of said plurality of base stations in a cellular system and a predetermined area, and information about said second frequency interval is transmitted from said one of said plurality of base stations to said one of said plurality of subscribers.

6. The communication method according to claim 2, wherein a time alignment processing is not carried out when said communication control information is communicated and is carried out when said general information is communicated.

7. The communication method according to claim 2, wherein a multi-carrier signal allocating said plurality of sub-carriers in a predetermined frequency interval as a unit is employed.

8. The communication method according to claim 7, wherein said communication control information is an access priority request signal transmitted from one of said plurality of subscribers to one of said plurality of base stations.

9. The communication method according to claim 8, wherein said second frequency interval is N times, being an integer, as wide as said first frequency interval.

10. The communication method according to claim 7, wherein said second frequency interval is set by one of each of said plurality of base stations in a cellular system and a predetermined area, and information about said second frequency interval is transmitted from said one of said plurality of base stations to said one of said plurality of subscribers.

11. The communication method according to claim 7, wherein a time alignment processing is not carried out when said communication control information is communicated and is carried out when said general information is communicated.

12. A base station in a cellular system in a multi-carrier format using a plurality of sub-carriers for communicating with a subscriber, comprising:

receiving means for receiving a signal from said subscriber;

reception processing means for processing in a first state, wherein an interval among said plurality of sub-carriers is set to a first frequency interval when general information is communicated, and for processing in a second state, wherein an interval among said plurality of sub-carriers is set to a second frequency interval wider than said first frequency interval when communication control information is communicated;

signal generating means for generating a signal to be transmitted to said subscriber; and transmitting means for transmitting said signal generated by said signal generating means to said subscriber.

13. The base station in said cellular system according to claim 12, wherein said communication control information is an access priority request signal transmitted from said subscriber to said base station.

14. The base station in said cellular system according to claim 12, wherein said second frequency interval is N times, N being an integer, as wide as said first frequency interval.

15. The base station in said cellular system according to claim 12, wherein information about said second frequency interval is transmitted from said transmitting means to said subscriber.

16. The base station in said cellular system according to claim 12, wherein said transmitting means transmits time alignment information to said subscriber when said reception processing means processes said general information and does not transmit said time alignment information to said subscriber when said reception processing means processes said communication control information.

17. The base station in said cellular system according to claim 12, wherein said receiving means and said transmitting means process a multi-carrier signal allocating said plurality of sub-carriers in a predetermined frequency interval as a unit.

18. The base station in said cellular system according to claim 17, wherein said communication control information is an access priority request signal transmitted from said subscriber to said base station.

19. The base station in said cellular system according to claim 17, wherein said second frequency interval is N times, N being an integer, as wide as said first frequency interval.

20. The base station in said cellular system according to claim 17, wherein information about said second frequency interval is transmitted from said transmitting means to said subscriber.

21. The base station in said cellular system according to claim 17, wherein said transmitting means transmits time alignment information to said subscriber when said reception processing means processes said general information and does not transmit said time alignment information to said subscriber when said reception processing means processes said communication control information.

22. A subscriber in a cellular system in a multi-carrier format using a plurality of sub-carriers for communicating with a base station, comprising:

reception means for receiving a signal from said base station;

reception processing means for processing said signal received by said reception means;

signal generating means for generating a first signal formed in a first state, wherein an interval among said plurality of sub-carriers is set to a first frequency interval when general information is communicated, and for generating a second signal formed in a second state, wherein an interval among said plurality of sub-carriers is set to a second frequency interval wider than said first frequency interval when communication control information is communicated; and transmitting means for transmitting said first signal and said second signal generated by said signal generating means to said base station.

23. The subscriber in said cellular system according to claim 22, wherein said communication control information is an access priority request signal transmitted from said subscriber to said base station.

24. The subscriber in said cellular system according to claim 22, wherein said second frequency interval is N times, N being an integer, as wide as said first frequency interval.

25. The subscriber in said cellular system according to claim 22, wherein information about said second frequency interval is received by said reception means from said base station, and said signal generating means generates a signal based on said received information about said second frequency interval.

26. The subscriber in said cellular system according to claim 22, wherein said signal generating means generates a signal based on time alignment information from said base station when said general information is generated and does not generate said signal based on said time alignment information from said base station when said communication control information is generated.

27. The subscriber in said cellular system according to claim 22, wherein said reception means and said transmitting means process a multi-carrier signal including a plurality of sub-carriers in a predetermined frequency interval as a unit.

28. The subscriber in said cellular system according to claim 27, wherein said communication control information is an access priority request signal from said subscriber to said base station.

29. The subscriber in said cellular system according to claim 27, wherein said second frequency interval is N times, N being an integer, as wide as said first frequency interval.

30. The subscriber in said cellular system according to claim 27, wherein information about said second frequency interval is received by said reception means from said base station, and said signal generating means generates a signal based on said received information about said second frequency interval.

31. The subscriber in said cellular system according to claim 27, wherein said signal generating means generates a signal based on time alignment information from said base station when said general information is generated and does not generate said signal based on said time alignment information from said base station when said communication control information is generated.

* * * * *